(12) United States Patent
Hur et al.

(10) Patent No.: US 11,031,595 B2
(45) Date of Patent: Jun. 8, 2021

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventors: Hyuck Hur, Daejeon (KR); Min Kyu You, Daejeon (KR); Chi Ho Jo, Daejeon (KR); Sung Bin Park, Daejeon (KR); Jin Tae Hwang, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/486,409

(22) PCT Filed: Sep. 5, 2018

(86) PCT No.: PCT/KR2018/010387
§ 371 (c)(1),
(2) Date: Aug. 15, 2019

(87) PCT Pub. No.: WO2019/050282
PCT Pub. Date: Mar. 14, 2019

(65) Prior Publication Data
US 2020/0020946 A1 Jan. 16, 2020

(30) Foreign Application Priority Data
Sep. 8, 2017 (KR) .................. 10-2017-0115473

(51) Int. Cl.
| | |
|---|---|
| *H01M 4/525* | (2010.01) |
| *C01G 51/00* | (2006.01) |
| *H01M 4/131* | (2010.01) |
| *H01M 10/0525* | (2010.01) |
| *H01M 4/02* | (2006.01) |
| *H01M 4/1393* | (2010.01) |
| *H01M 4/13915* | (2010.01) |

(52) U.S. Cl.
CPC .......... *H01M 4/525* (2013.01); *C01G 51/66* (2013.01); *H01M 4/131* (2013.01); *H01M 10/0525* (2013.01); *C01P 2002/52* (2013.01); *C01P 2004/03* (2013.01); *C01P 2004/61* (2013.01); *C01P 2006/40* (2013.01); *H01M 4/1393* (2013.01); *H01M 4/13915* (2013.01); *H01M 2004/028* (2013.01)

(58) Field of Classification Search
CPC .. H01M 4/525; H01M 4/131; H01M 4/13915; H01M 4/1393
See application file for complete search history.

(56) References Cited

U.S. PATENT DOCUMENTS

| | | |
|---|---|---|
| 2003/0073004 A1 | 4/2003 | Kweon et al. |
| 2004/0213729 A1 | 10/2004 | Suhara et al. |
| 2005/0019662 A1 | 1/2005 | Suhara et al. |
| 2005/0250013 A1 | 11/2005 | Tatsumi et al. |
| 2006/0154146 A1 | 7/2006 | Kawasato et al. |
| 2006/0210879 A1 | 9/2006 | Kawasato et al. |
| 2006/0222951 A1 | 10/2006 | Tatsumi et al. |
| 2008/0160410 A1 | 7/2008 | Sun et al. |
| 2009/0087362 A1 | 4/2009 | Sun et al. |
| 2012/0034516 A1 | 2/2012 | Koo et al. |
| 2014/0234718 A1 | 8/2014 | Lee et al. |
| 2015/0147655 A1 | 5/2015 | Park et al. |
| 2015/0162598 A1 | 6/2015 | Kim et al. |

FOREIGN PATENT DOCUMENTS

| | | |
|---|---|---|
| CN | 102610806 A | 7/2012 |
| CN | 102779976 B | 5/2015 |
| CN | 105449197 A | 3/2016 |
| JP | 2000203842 A | 7/2000 |
| JP | 2008521196 A | 6/2008 |
| KR | 20030032363 A | 4/2003 |
| KR | 20040053217 A | 6/2004 |
| KR | 20040085160 A | 10/2004 |
| KR | 20050057566 A | 6/2005 |
| KR | 20060028408 A | 3/2006 |
| KR | 20060041249 A | 5/2006 |
| KR | 20060109305 A | 10/2006 |
| KR | 20060128814 A | 12/2006 |
| KR | 100812547 B1 | 3/2008 |
| KR | 101056714 B1 | 8/2011 |
| KR | 20120114811 A | 10/2012 |
| KR | 20140018685 A | 2/2014 |
| KR | 20150026864 A | 3/2015 |
| KR | 101572078 B1 | 11/2015 |
| WO | 2003069702 A1 | 8/2003 |
| WO | 2004023583 A1 | 3/2004 |
| WO | 2004030126 A1 | 4/2004 |
| WO | 2005018027 A1 | 2/2005 |

(Continued)

OTHER PUBLICATIONS

International Search Report for Application No. PCT/KR2018/010387, dated Dec. 11, 2018, pp. 1-2.

(Continued)

*Primary Examiner* — Ladan Mohaddes
(74) *Attorney, Agent, or Firm* — Lerner, David, Littenberg, Krumholz & Mentlik, LLP (57) ABSTRACT

In one embodiment, the present disclosure relates to a positive electrode active material in which a lithium cobalt oxide is doped with a doping element including a metallic element and a halide element, wherein the positive electrode active material is represented by Formula 1 and satisfies Equation 1, and a positive electrode for a lithium secondary battery and a lithium secondary battery, either of which include the positive electrode active material:

$Li(Co_{1-x-y-z}M^1{}_xM^2{}_yM^3{}_z)O_{2-a}H_a$      [Formula 1]

$(2x+3y+4z-a)/(x+y+z+a)<2.5.$      [Equation 1]

13 Claims, 4 Drawing Sheets

(56) References Cited

FOREIGN PATENT DOCUMENTS

| WO | 2005106993 A1 | 11/2005 |
| WO | 2005112152 A1 | 11/2005 |

OTHER PUBLICATIONS

Extended European Search Report with Written Opinion for Application No. 18854688.3 dated Apr. 16, 2020, 7 pages.

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

The present application is a national phase entry under 35 U.S.C. § 371 of International Application No. PCT/KR2018/010387 filed Sep. 5, 2018, the disclosure of which is incorporated herein in its entirety by reference, which claims priority to Korean Patent Application No. 10-2017-0115473, filed on Sep. 8, 2017, in the Korean Intellectual Property Office, the disclosures of which are incorporated herein in its entirety by reference.

TECHNICAL FIELD

Technical Field

The present invention relates to a positive electrode active material for a lithium secondary battery, a method of preparing the positive electrode active material, a positive electrode for a lithium secondary battery including the positive electrode active material, and a lithium secondary battery including the positive electrode.

Background Art

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, various lithium transition metal oxides, for example, a lithium cobalt oxide such as $LiCoO_2$, $LiNiO_2$, $LiMnO_2$, $LiMn_2O_4$, $LiFePO_4$, a lithium nickel cobalt manganese-based oxide, and $Li(Ni_a Co_b Mn_c)O_2$ (where a, b, and c are atomic fractions of each independent oxide composition elements, wherein $0<a<1$, $0<b<1$, $0<c<1$, and $a+b+c=1$), have been used.

Among these lithium transition metal oxides, a lithium cobalt composite metal oxide of $LiCoO_2$ having a high operating voltage and excellent capacity characteristics has been mainly used. However, since the $LiCoO_2$ has very poor thermal properties due to an unstable crystal structure caused by delithiation and is expensive, there is a limitation in using a large amount of the $LiCoO_2$ as a power source for applications such as electric vehicles.

Thus, there is a need to develop a positive electrode active material which may provide excellent stability of a battery even at high voltage and may improve life characteristics at high temperature.

DISCLOSURE OF THE INVENTION

Technical Problem

An aspect of the present invention provides a positive electrode active material for a lithium secondary battery having improved structural stability.

Another aspect of the present invention provides a method of preparing a positive electrode active material for a lithium secondary battery including the positive electrode active material.

Another aspect of the present invention provides a positive electrode for a lithium secondary battery including the positive electrode active material.

Another aspect of the present invention provides a lithium secondary battery which includes the positive electrode for a lithium secondary battery, has excellent structural stability, and has excellent durability while having high capacity at a high voltage of 4.5 V or more.

Technical Solution

According to an aspect of the present invention, there is provided a positive electrode active material in which a lithium cobalt oxide is doped with a doping element including a metallic element and a halide element, wherein the positive electrode active material is represented by Formula 1 and satisfies Equation 1:

$$Li(Co_{1-x-y-z}M^1_x M^2_y M^3_z)O_{2-a}H_a \qquad \text{[Formula 1]}$$

$$(2x+3y+4z-a)/(x+y+z+a)<2.5 \qquad \text{[Equation 1]}$$

wherein, in Formula 1, $M^1$ includes at least one metallic element with an oxidation number of 2 selected from the group consisting of magnesium (Mg), calcium (Ca), iron (Fe), nickel (Ni), cobalt (Co), copper (Cu), zirconium (Zr), strontium (Sr), cadmium (Cd), and barium (Ba), $M^2$ includes at least one metallic element with an oxidation number of 3 selected from the group consisting of aluminum (Al), scandium (Sc), yttrium (Y), niobium (Nb), indium (In), antimony (Sb), tantalum (Ta), iridium (Ir), and lanthanum (La), $M^3$ includes at least one metallic element with an oxidation number of 4 selected from the group consisting of manganese (Mn), titanium (Ti), tin (Sn), germanium (Ge), molybdenum (Mo), technetium (Tc), hafnium (Hf), tungsten (W), and lead (Pb), H includes at least one halogen element selected from the group consisting of $F^-$, $Cl^-$, $Br^-$, $I^-$, and $At^-$, $0 \leq x \leq 0.1$, $0 \leq y \leq 0.1$, $0 \leq z \leq 0.1$, $0 \leq x+y+z \leq 0.1$, and $0 < a \leq 0.3$, and wherein, in Equation 1, x is an amount of moles of the metallic element with an oxidation number of 2, y is an amount of moles of the metallic element with an oxidation number of 3, z is an amount of moles of the metallic element with an oxidation number of 4, and a is an amount of moles of the halide element.

According to another aspect of the present invention, there is provided a method of preparing a positive electrode active material including preparing a positive electrode active material, which is represented by Formula 1 and satisfies Equation 1, by mixing and sintering a cobalt oxide, a lithium-containing raw material, and a doping raw material.

According to another aspect of the present invention, there is provided a positive electrode for a lithium secondary battery including: a positive electrode collector; and a positive electrode active material layer formed on the positive electrode collector, wherein the positive electrode active material layer includes the positive electrode active material according to the present invention.

According to another aspect of the present invention, there is provided a lithium secondary battery including: the positive electrode according to the present invention; a negative electrode; a separator disposed between the positive electrode and the negative electrode; and an electrolyte.

Advantageous Effects

According to the present invention, since the structural stability of a lithium cobalt oxide is improved by allowing an amount of moles of a doping element included in the lithium cobalt oxide to satisfy specific conditions, it is possible to provide a lithium secondary battery which may stably operate at a high voltage of 4.5 V or more to exhibit excellent life characteristics.

Particularly, an effect of improving the life characteristics may be achieved by doping the lithium cobalt oxide with a halide element. In addition, an effect of improving the structural stability of the lithium cobalt oxide may be achieved by doping the lithium cobalt oxide with two or more metallic elements.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A lithium cobalt oxide used as a positive electrode active material of a conventional lithium secondary battery was advantageous in that mass production was easy due to ease of manufacturing and capacity characteristics were excellent due to high rolling density, but was disadvantageous in that stability of surface and structure was poor as the amount of lithium used was increased due to the use of high voltage for high capacity.

Thus, the present inventors have found that a lithium secondary battery having excellent life characteristics as well as excellent capacity characteristics while being able to be stably used due to an improvement in structural stability at a high voltage of 4.5 V or more may be prepared by doping the lithium cobalt oxide with two or more metallic elements and a halide element, but allowing an amount of moles of the doping element to satisfy specific conditions, thereby leading to the completion of the present invention.

Specifically, a positive electrode active material according to the present invention includes a lithium cobalt oxide doped with a doping element including two or more metallic elements and a halide element, wherein it may be represented by Formula 1 below.

$$Li(Co_{1-x-y-z}M^1_xM^2_yM^3_z)O_{2-a}H_a \quad \text{[Formula 1]}$$

In Formula 1, $M^1$ includes at least one metallic element with an oxidation number of 2 selected from the group consisting of magnesium (Mg), calcium (Ca), iron (Fe), nickel (Ni), cobalt (Co), copper (Cu), zirconium (Zr), strontium (Sr), cadmium (Cd), and barium (Ba), $M^2$ includes at least one metallic element with an oxidation number of 3 selected from the group consisting of aluminum (Al), scandium (Sc), yttrium (Y), niobium (Nb), indium (In), antimony (Sb), tantalum (Ta), iridium (Ir), and lanthanum (La), $M^3$ includes at least one metallic element with an oxidation number of 4 selected from the group consisting of manganese (Mn), titanium (Ti), tin (Sn), germanium (Ge), molybdenum (Mo), technetium (Tc), hafnium (Hf), tungsten (W), and lead (Pb), H is at least one halogen element selected from the group consisting of $F^-$, $Cl^-$, $Br^-$, $I^-$, and $At^-$, $0 \leq x \leq 0.1$, $0 \leq y \leq 0.1$, $0 \leq z \leq 0.1$, $0 x+y+z \leq 0.1$, and $0 < a \leq 0.3$.

The positive electrode active material may specifically include at least one $M^1$ selected from the group consisting of Mg, Ca, Ni, and Zr, at least one $M^2$ selected from the group consisting of Al, Sc, and Y, at least one $M^3$ selected from the group consisting of Mn, Ti, and Sn, and at least one halogen element selected from the group consisting of $F^-$, $Cl^-$, and $I^-$. For example, the positive electrode active material may preferably include at least one of $LiCo_{0.98}Al_{0.01}Mg_{0.01}O_{1.98}F_{0.02}$ or $LiCo_{0.98}Al_{0.01}Ca_{0.01}O_{1.98}F_{0.02}$.

Specifically, the doping element includes at least two metallic elements selected from the group consisting of $M^1$, $M^2$, and $M^3$ and a halide element, and satisfies Equation 1 below.

$$(2x+3y+4z-a)/(x+y+z+a) < 2.5 \quad \text{[Equation 1]}$$

In Equation 1, x is an amount of moles of the metallic element with an oxidation number of 2, y is an amount of moles of the metallic element with an oxidation number of 3, z is an amount of moles of the metallic element with an oxidation number of 4, and a is an amount of moles of the halide element.

In a case in which at least two metallic elements selected from the group consisting of the metallic element $M^1$ with an oxidation number of 2, the metallic element $M^2$ with an oxidation number of 3, and the metallic element $M^3$ with an oxidation number of 4, and the halide element with an oxidation number of −1 are included together as the doping element as in the present invention, an effect of improving crystal structure stability and an effect of improving high-temperature structure stability and thermal stability may be achieved.

As described above, since the lithium cobalt oxide is doped with at least two metallic elements selected from the group consisting of $M^1$, $M^2$, and $M^3$ and the halide element, a positive electrode active material having improved structural stability while having the same crystal structure as a conventional lithium cobalt oxide ($LiCoO_2$, bare LCO) may be prepared. Specifically, the lithium cobalt oxide represented by Formula 1 may have a layered crystal structure. Furthermore, since life characteristics of a secondary battery including the same may be improved, capacity characteristics at a high voltage of 4.5 V or more may be particularly improved when used in the battery.

By contrast, in a case in which the halide element is not included, but only the metallic element is included as the doping element, since the high-temperature structure stability and thermal stability are not improved, an effect of improving high-temperature life characteristics and capacity characteristics at a high voltage of 4.5 V or more may be reduced. Also, in a case in which the metallic element is not included, but only the halide element is included as the doping element, since stability of the layered structure is not secured, an effect of improving life characteristics may be reduced and a particle size distribution of the finally obtained positive electrode active material may not be easily controlled. Furthermore, in a case in which two metallic elements are only included as the doping element, since an effect of controlling the particle size distribution due to the addition of the halide element may not be achieved, a positive electrode active material having a non-uniform particle size distribution is prepared, and, accordingly, volume capacity of the battery may be reduced. In a case in which only one metallic element and one halide element are included as the doping element, since the effect of improving the structural stability of the positive electrode active material is reduced, life characteristics may be degraded when the positive electrode active material is used in the battery.

A total amount of the doping element in the positive electrode active material may be in a range of 100 ppm to 10,000 ppm, for example, 2,000 ppm to 6,000 ppm. Since the doping element is included within the above range, deintercalation rate of lithium ions may be reduced, and thus, the effect of improving the structural stability at a high voltage of 4.5 V or more and the effect of improving high-temperature life characteristics of the battery prepared by using the positive electrode active material may be achieved.

The positive electrode active material may have an average particle diameter ($D_{50}$) of 4 μm to 24 μm, preferably 10 μm to 24 μm, and more preferably 15 μm to 20 μm. When the positive electrode active material has the average particle diameter within the above range, high energy density may be achieved and an effect of improving rate capability and initial capacity characteristics may be more pronounced.

The average particle diameters ($D_{50}$) of the positive electrode active material may be defined as a particle diameter at a cumulative volume of 50% in a particle size distribution curve. For example, the average particle diameters ($D_{50}$) of the positive electrode active material may be measured by using a laser diffraction method. The laser diffraction method may generally measure a particle diameter ranging from a submicron level to a few mm, and may obtain highly repeatable and high resolution results. For example, in a method of measuring the average particle diameter ($D_{50}$) of the positive electrode active material, the positive electrode active material is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, since the positive electrode active material is doped with at least two metallic elements selected from the group consisting of $M^1$, $M^2$, and $M^3$ and the halide element, a particle growth rate may be controlled to form more uniform particles, and, accordingly, particle size control of the positive electrode active material may be easy. The finally obtained positive electrode active material particles may be uniform particles having a $(D_{95}-D_5)/D_{50}$ of 1.0 to 2.0, for example, 1.5 to 2.0. Since the positive electrode active material particles having a uniform shape are prepared as described above, an amount of particles, which may be included per unit area, is improved, and thus, the volume capacity of the battery may be improved.

In the present invention, average particle diameters $D_5$, $D_{50}$, and $D_{95}$ of the positive electrode active material may be respectively defined as particle diameters at cumulative volumes of 5%, 50%, and 95% in a particle size distribution curve. In the present invention, the particle diameter distribution of the positive electrode active material, for example, may be measured by using a laser diffraction method. Specifically, with respect to the average particle diameters of the positive electrode active material, after particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameters respectively at 5%, 50%, and 95% in a cumulative particle diameter distribution of the measurement instrument may then be calculated.

A method of preparing a positive electrode active material according to the present invention prepares a positive electrode active material, which is represented by the following Formula 1 and satisfies the following Equation 1, by mixing and sintering a cobalt oxide, a lithium-containing raw material, and a doping raw material.

$$Li(Co_{1-x-y-z}M^1_xM^2_yM^3_z)O_{2-a}H_a \qquad \text{[Formula 1]}$$

$$(2x+3y+4z-a)/(x+y+z+a)<2.5 \qquad \text{[Equation 1]}$$

In Formula 1, $M^1$ includes at least one metallic element with an oxidation number of 2 selected from the group consisting of Mg, Ca, Fe, Ni, Co, Cu, Zr, Sr, Cd, and Ba, $M^2$ includes at least one metallic element with an oxidation number of 3 selected from the group consisting of Al, Sc, Y, Nb, In, Sb, Ta, Ir, and La, $M^3$ includes at least one metallic element with an oxidation number of 4 selected from the group consisting of Mn, Ti, Sn, Ge, Mo, Tc, Hf, W, and Pb, H is at least one halogen element selected from the group consisting of $F^-$, $Cl^-$, $Br^-$, $I^-$, and $At^-$, $0 \leq x \leq 0.1$, $0 \leq y \leq 0.1$, $0 \leq z \leq 0.1$, $0 \leq x+y+z \leq 0.1$, and $0 < a \leq 0.3$, and, in Equation 1, x is an amount of moles of the metallic element with an oxidation number of 2, y is an amount of moles of the metallic element with an oxidation number of 3, z is an amount of moles of the metallic element with an oxidation number of 4, and a is an amount of moles of the halide element.

First, a cobalt oxide, a lithium-containing raw material, and a doping raw material are mixed.

For example, the cobalt oxide may include at least one selected from the group consisting of $Co_3O_4$ and CoOOH.

For example, the lithium-containing raw material is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

The cobalt oxide and the lithium-containing raw material may be mixed in a molar ratio of 1:0.95 to 1:1.1, for example, 1:1 to 1:1.05. In a case in which the cobalt oxide and the lithium-containing raw material are mixed in the above range, the positive electrode active material prepared may exhibit excellent capacity.

The lithium-containing raw material may be determined according to amounts of lithium and metal (Co) in the finally prepared positive electrode active material, and may be used in an amount such that the molar ratio (molar ratio of Li/Co) of lithium included in the lithium-containing raw material to cobalt included in the cobalt oxide is in a range of 0.95 or more, preferably 1 to 1.1, and more preferably 1 to 1.05. In a case in which the molar ratio of the lithium-containing raw material to the cobalt oxide satisfies the above range, the positive electrode active material prepared may exhibit excellent capacity.

The doping raw material may be mixed such that a total amount of the doping raw material is in a range of 10 ppm to 10,000 ppm based on a total combined weight of the cobalt oxide and the lithium-containing raw material. A change in structure of the positive electrode active material at high voltage may be prevented by including the doping raw material within the above range, and the effect of improving the structural stability and the effect of improving life characteristics of the battery prepared by using the positive electrode active material may be achieved.

The doping raw material may include metal and metal halide. For example, the metal halide may include at least one selected from the group consisting of $MgF_2$, $CaF_2$, $MgCl_2$, $CaCl_2$, $MgI_2$, and $CaI_2$. In a case in which the positive electrode active material is doped with the metal halide, the high-voltage structural stability and thermal stability of the lithium cobalt oxide may be further improved due to an effect of strengthening binding between the halide element and the metallic element. For example, the metal may include at least one selected from the group consisting of Mg, Ca, Zr, Al, Mn, Fe, Ni, Cu, cerium (Ce), Ti, thorium (Th), silver (Ag), Nb, Mo, and W. Preferably, the doping raw material may include two or more metals. In a case in which two or more metallic elements are doped, the effect of improving structural stability at high voltage may be achieved.

As described above, the particle size may be easily controlled and high-temperature characteristics may be improved by mixing the cobalt oxide, the lithium-containing raw material, and the doping raw material at the same time, but, in this case, using a material including the metal and the metal halide as the doping raw material. By contrast, in a case in which the cobalt oxide, the lithium-containing raw material, and the doping raw material are not mixed at the same time, but are mixed in portions during the process, since the particle size control may not be easy, uniformity of the particle size distribution of the finally prepared positive electrode active material may be reduced.

Sintering may be performed in a temperature range of 800° C. to 1,200° C., for example, 900° C. to 1,050° C. In a case in which the sintering temperature satisfies the above range, since the raw materials do not remain in the particles, high-temperature stability of the battery may be improved. Accordingly, volume density and crystallinity are improved, and, as a result, the structural stability of the positive electrode active material may be improved. Also, since the particles of the positive electrode active material uniformly grow, the volume capacity of the battery may be improved.

The sintering may be performed for 10 hours to 20 hours, for example, 8 hours to 17 hours. In a case in which the sintering time satisfies the above range, high crystalline positive electrode active material may be obtained, and production efficiency may also be improved.

Also, the present invention provides a positive electrode for a secondary battery including a positive electrode collector and a positive electrode active material layer formed on the positive electrode collector, wherein the positive electrode active material layer includes the positive electrode active material according to the present invention.

In this case, since the positive electrode active material is the same as described above, detailed descriptions thereof will be omitted and, hereinafter, the remaining configurations will be described in detail.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and selectively a binder, if necessary, in addition to the positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, the present invention may prepare an electrochemical device including the positive electrode. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted and, hereinafter, the remaining configurations will be described in detail.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a nitrile-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Specifically, after the lithium secondary battery is charged and discharged at 0.1 C in a constant current/constant voltage (CC/CV) charge mode with an upper limit voltage of 4.55 V and in a CC discharge mode with a lower limit voltage of 2.5 V, capacity retention after 50 cycles of charge and discharge at 0.5 C/1 C is 90% or more.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in more detail according to examples. However, the invention may be embodied in many different forms and should not be construed as being limited to the embodiments set forth herein. Rather, these exemplary embodiments are provided so that this description will be thorough and complete, and will fully convey the scope of the present invention to those skilled in the art.

EXAMPLES

Example 1

[Positive Electrode Active Material Preparation]

After 200 g of $Co_3O_4$ and, as a doping element, 6,000 ppm of $MgF_2$ and 3,000 ppm of Al were mixed and 97.416 g of $Li_2CO_3$ was mixed therewith so that a molar ratio of Li/Co was 1.06, the mixture was heat-treated at 1,050° C. for 17 hours in an air atmosphere to prepare a positive electrode active material represented by LiCo$_{0.98}$Al$_{0.01}$Mg$_{0.01}$O$_{1.98}$F$_{0.02}$.

[Positive Electrode Preparation]

The above-prepared positive electrode active material particles, a PVdF binder, and a natural graphite conductive agent were mixed in NMP at a weight ratio of 95:2.5:2.5 to prepare a composition for forming a positive electrode. A 20 µm thick Al foil was coated with the composition for forming a positive electrode, dried at 130° C., and then roll-pressed to prepare a positive electrode.

[Lithium Secondary Battery Preparation]

After a polyethylene separator was disposed between the above-prepared positive electrode and a Li metal counter electrode, a lithium secondary battery (coin-type half cell) was prepared by a conventional method by injecting an electrolyte solution which was prepared by dissolving 1 M LiPF$_6$ in a solvent in which ethylene carbonate:dimethyl carbonate:diethyl carbonate (EC:DMC:DEC) were mixed in a ratio of 1:2:1.

Example 2

A positive electrode active material represented by LiCo$_{0.98}$Al$_{0.01}$Ca$_{0.01}$O$_{1.98}$F$_{0.02}$ was prepared in the same manner as in Example 1 except that 8,000 ppm of CaF$_2$ and 3,000 ppm of Al were included as a doping element.

Comparative Example 1

A LiCoO$_2$ positive electrode active material was prepared in the same manner as in Example 1 except that a positive electrode active material precursor without a doping element was used.

Comparative Example 2

A LiCo$_{0.96}$Al$_{0.02}$Mg$_{0.02}$O$_2$ positive electrode active material was prepared in the same manner as in Example 1 except that 3,000 ppm of Al and 6,000 ppm of Mg were included as a doping element during the preparation of a positive electrode active material precursor.

Comparative Example 3

A LiCo$_{0.935}$Mg$_{0.005}$Al$_{0.04}$Ti$_{0.02}$O$_{1.99}$F$_{0.01}$ positive electrode active material was prepared in the same manner as in Example 1 except that 5,000 ppm of Al, 500 ppm of MgF$_2$, and 5,000 ppm of Ti were included as a doping element during the preparation of a positive electrode active material precursor.

Experimental Example 1

Confirmation of Particle Size Distribution of Positive Electrode Active Material In order to confirm particle size distributions of the positive electrode active material particles prepared in Examples 1 and 2 and Comparative Examples 1 to 3, particle diameters of the positive electrode active materials prepared in Examples 1 and 2 and Comparative Examples 1 to 3 were measured using a Microtrac s3000, and the results thereof are presented in Table 1 below. Particularly, with respect to the positive electrode active material particles prepared in Examples 1 and 2 and Comparative Example 1, surface characteristics of the positive electrode active materials were checked using a scanning electron microscope as in FIGS. 1 to 3.

TABLE 1

|  | $D_5$ (µm) | $D_{50}$ (µm) | $D_{95}$ (µm) | $(D_{95} - D_5)/D_{50}$ |
|---|---|---|---|---|
| Example 1 | 8.9 | 18.8 | 36.7 | 1.48 |
| Example 2 | 5.2 | 15.6 | 36.2 | 1.99 |
| Comparative Example 1 | 3.23 | 23.0 | 50.8 | 2.07 |
| Comparative Example 2 | 6.6 | 28.3 | 76.0 | 2.45 |
| Comparative Example 3 | 5.63 | 21.2 | 75.8 | 3.31 |

Referring to Table 1, with respect to Examples 1 and 2, it may be understood that the positive electrode active materials having a narrower particle size distribution than Comparative Examples 1 to 3 were prepared. From these results, it was understood that the positive electrode active materials prepared in Examples 1 and 2 had more uniform particle sizes than the positive electrode active materials prepared in Comparative Examples 1 to 3. The reason for this is that, since the particle growth rate was controlled by doping the positive electrode active materials with at least two metallic elements and the halide element, more uniform particles were formed.

Figure 1:
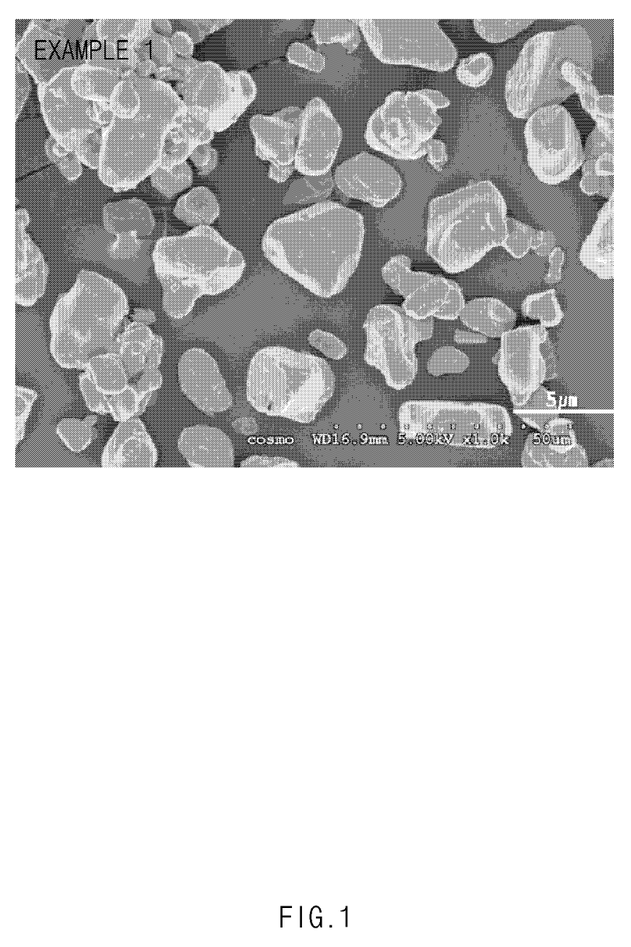
FIG. 1 is a scanning electron microscope (SEM) image of a positive electrode active material prepared in Example 1 of the present invention.
Figure 2:
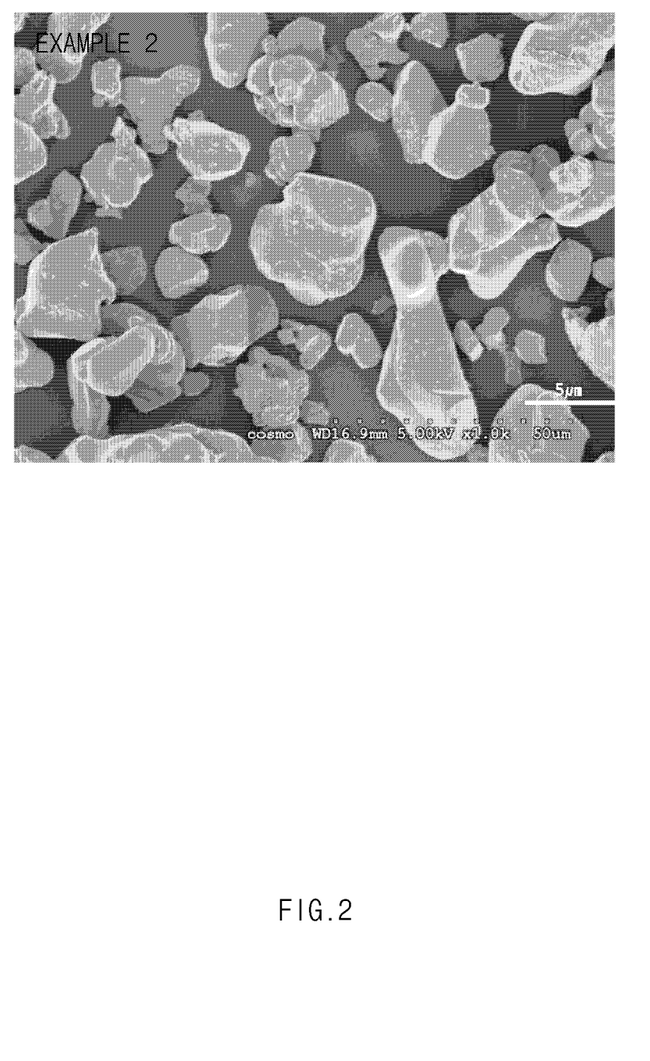
FIG. 2 is an SEM image of a positive electrode active material prepared in Example 2 of the present invention.
Figure 3:
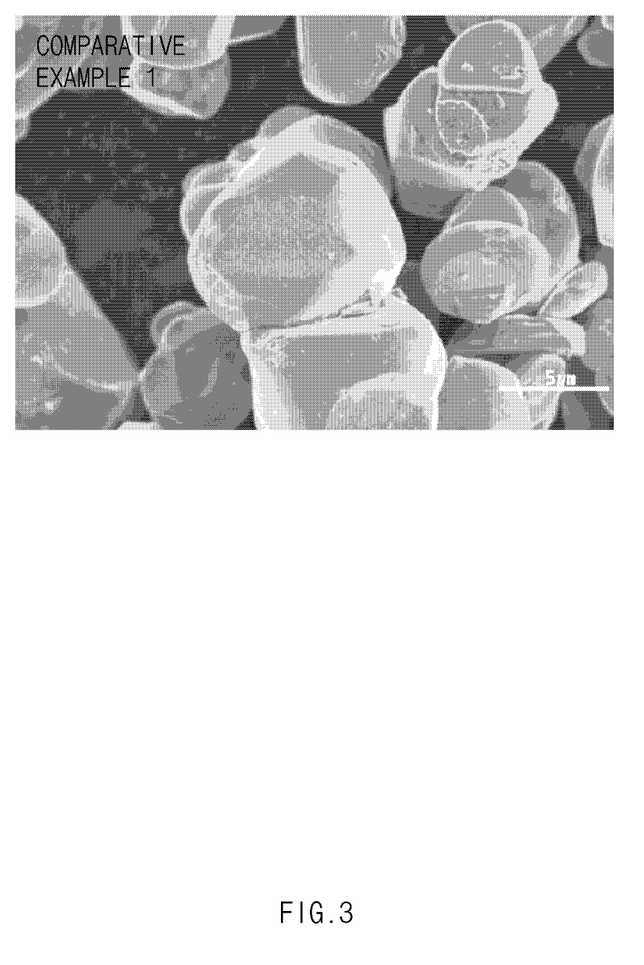
FIG. 3 is an SEM image of a positive electrode active material prepared in Comparative Example 1 of the present invention.

Particularly, as illustrated in FIGS. 1 and 2, with respect to the positive electrode active materials prepared in Examples 1 and 2, it was confirmed that the positive electrode active materials having a uniform distribution were formed. In contrast, with respect to the positive electrode active material prepared in Comparative Example 1, it was confirmed that the positive electrode active material in an agglomerated form, which included a less uniform distribution, was formed as illustrated in FIG. 3. Since, in Examples 1 and 2, the particle growth rate was controlled by doping the positive electrode active materials with at least two metallic elements and the halide element, more uniform particles were formed, and, accordingly, it was confirmed that the positive electrode active materials had a uniform distribution.

Experimental Example 2

Life Cycle Characteristics of Secondary Battery

Life characteristics of the coin-type half cells prepared in Examples 1 and 2 and Comparative Examples 1 to 3 were measured at 4.5 V.

Specifically, after each of the coin-type half cells prepared in Examples 1 and 2 and Comparative Examples 1 to 3 was charged and discharged at 0.1 C in a constant current/constant voltage (CC/CV) charge mode with an upper limit voltage of 4.55 V and in a CC discharge mode with a lower limit voltage of 2.5 V at 45° C., life characteristics at a 0.5 C/1 C charge/discharge rate were evaluated, and the results thereof are presented in Table 2 and FIG. 4 below.

TABLE 2

|  | Capacity retention (%) |
|---|---|
| Example 1 | 91.8 |
| Example 2 | 93.1 |
| Comparative Example 1 | 82.2 |

TABLE 2-continued

| | Capacity retention (%) |
|---|---|
| Comparative Example 2 | 87.6 |
| Comparative Example 3 | 88.7 |

Figure 4:
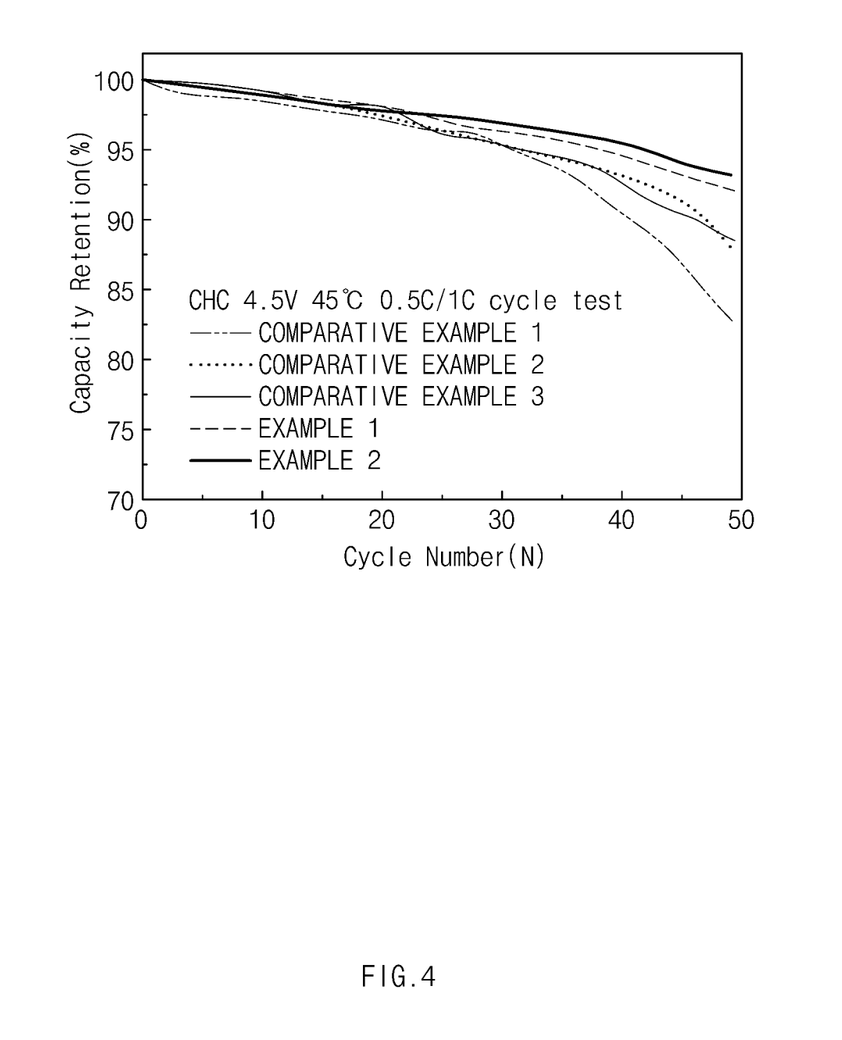
FIG. 4 is a graph illustrating cycle life characteristics of coin-type half cells prepared in Examples 1 and 2 of the present invention and Comparative Examples 1 to 3 at 4.5 V.

As illustrated in Table 2 and FIG. 4, it was confirmed that, during 50 charge/discharge cycles, the coin-type half cells according to Examples 1 and 2 exhibited an excellent capacity retention of 91% or more. However, with respect to the coin-type half cells according to Comparative Examples 1 to 3, capacity retentions were rapidly reduced after 30 cycles, and it was confirmed that the capacity retentions were reduced to about 85% or less after 50 charge/discharge cycles. With respect to the positive electrode active materials prepared in Examples 1 and 2, since structural stability of the lithium cobalt oxides was improved by doping with two or more metallic elements and a halide element, a stable operation at a high voltage of 4.5 V or more was possible, and thus, it was confirmed that life characteristics at high voltage were improved.

The invention claimed is:

1. A positive electrode active material comprising a lithium cobalt oxide doped with a doping element comprising a metallic element and a halide element,
   wherein the positive electrode active material is represented by Formula 1 and satisfies Equation 1:

$$Li(Co_{1-x-y-z}M^1_xM^2_yM^3_z)O_{2-a}H_a \qquad \text{[Formula 1]}$$

$$(2x+3y+4z-a)/(x+y+z+a)<2.5 \qquad \text{[Equation 1]}$$

wherein, in Formula 1,
   $M^1$ comprises at least one metallic element with an oxidation number of 2 selected from the group consisting of magnesium (Mg), calcium (Ca), iron (Fe), nickel (Ni), cobalt (Co), copper (Cu), zirconium (Zr), strontium (Sr), cadmium (Cd), and barium (Ba),
   $M^2$ comprises at least one metallic element with an oxidation number of 3 selected from the group consisting of aluminum (Al), scandium (Sc), yttrium (Y), niobium (Nb), indium (In), antimony (Sb), tantalum (Ta), iridium (Ir), and lanthanum (La),
   $M^3$ comprises at least one metallic element with an oxidation number of 4 selected from the group consisting of manganese (Mn), titanium (Ti), tin (Sn), germanium (Ge), molybdenum (Mo), technetium (Tc), hafnium (Hf), tungsten (W), and lead (Pb),
   H comprises at least one halogen element selected from the group consisting of $F^-$, $Cl^-$, $Br^-$, $I^-$, and $At^-$,
   $0 \leq x \leq 0.1$, $0 \leq y \leq 0.1$, $0 \leq z \leq 0.1$, $0 \leq x+y+z \leq 0.1$, and $0 < a \leq 0.3$, and
   wherein, in Equation 1,
   x is an amount of moles of the metallic element with an oxidation number of 2, y is an amount of moles of the metallic element with an oxidation number of 3, z is an amount of moles of the metallic element with an oxidation number of 4, and a is an amount of moles of the halide element,
   wherein the positive electrode active material has a particle size distribution whereby $(D_{95}-D_5)/D_{50}$ of 1.5 to 2.0.

2. The positive electrode active material of claim 1, wherein the doping element comprises at least two metallic elements selected from the group consisting of $M^1$, $M^2$, and $M^3$ and the halide element.

3. The positive electrode active material of claim 1, wherein a total amount of the doping element in the positive electrode active material is in a range of 100 ppm to 10,000 ppm.

4. The positive electrode active material of claim 1, wherein the positive electrode active material has an average particle diameter $(D_{50})$ of 4 μm to 24 μm.

5. A method of preparing a positive electrode active material, the method comprising preparing a positive electrode active material, which is represented by Formula 1 and satisfies Equation 1, by mixing and sintering a cobalt oxide, a lithium-containing raw material, and a doping raw material to form a particle size distribution whereby $(D_{95}-D_5)/D_{50}$ is 1.5 to 2.0:

$$Li(Co_{1-x-y-z}M^1_xM^2_yM^3_z)O_{2-a}H_a \qquad \text{[Formula 1]}$$

$$(2x+3y+4z-a)/(x+y+z+a)<2.5 \qquad \text{[Equation 1]}$$

wherein, in Formula 1,
   $M^1$ comprises at least one metallic element with an oxidation number of 2 selected from the group consisting of magnesium (Mg), calcium (Ca), iron (Fe), nickel (Ni), cobalt (Co), copper (Cu), zirconium (Zr), strontium (Sr), cadmium (Cd), and barium (Ba),
   $M^2$ comprises at least one metallic element with an oxidation number of 3 selected from the group consisting of aluminum (Al), scandium (Sc), yttrium (Y), niobium (Nb), indium (In), antimony (Sb), tantalum (Ta), iridium (Ir), and lanthanum (La),
   $M^3$ comprises at least one metallic element with an oxidation number of 4 selected from the group consisting of manganese (Mn), titanium (Ti), tin (Sn), germanium (Ge), molybdenum (Mo), technetium (Tc), hafnium (Hf), tungsten (W), and lead (Pb),
   H comprises at least one halogen element selected from the group consisting of $F^-$, $Cl^-$, $Br^-$, $I^-$, and $At^-$,
   $0 \leq x \leq 0.1$, $0 \leq y \leq 0.1$, $0 \leq z \leq 0.1$, $0 \leq x+y+z \leq 0.1$, and $0 < a \leq 0.3$, and
   wherein, in Equation 1,
   x is an amount of moles of the metallic element with an oxidation number of 2, y is an amount of moles of the metallic element with an oxidation number of 3, z is an amount of moles of the metallic element with an oxidation number of 4, and a is an amount of moles of the halide element.

6. The method of claim 5, wherein the doping element comprises a metal and a metal halide.

7. The method of claim 6, wherein the metal halide comprises at least one selected from the group consisting of $MgF_2$, $CaF_2$, $MgCl_2$, $CaCl_2$, $MgI_2$, and $CaI_2$.

8. A positive electrode for a lithium secondary battery, the positive electrode comprising:
   a positive electrode collector; and
   a positive electrode active material layer formed on the positive electrode collector,
   wherein the positive electrode active material layer comprises the positive electrode active material of claim 1.

9. A lithium secondary battery comprising:
   the positive electrode of claim 8;
   a negative electrode;
   a separator disposed between the positive electrode and the negative electrode; and
   an electrolyte.

10. The lithium secondary battery of claim 9, wherein, after the lithium secondary battery is charged and discharged at 0.1 C in a constant current/constant voltage (CC/CV) charge mode with an upper limit voltage of 4.55 V and in a CC discharge mode with a lower limit voltage of 2.5 V, capacity retention after 50 cycles of charge and discharge at 0.5 C/1 C is 90% or more.

11. The method of claim 5, wherein the doping raw material is mixed such that a total amount of the doping raw material in in a range of 10 ppm to 10,000 ppm.

12. The method of claim 5, wherein the step of sintering occurs after the step of mixing.

13. The method of claim 12, wherein the step of sintering includes sintering at a temperature range of 800° C. to 1,200° C. for 10 hours to 20 hours.

* * * * *